United States Patent Office 3,812,100
Patented May 21, 1974

3,812,100
6-[(3,5,7 - TRIAZA - 1-AZONIA-1-ADAMANTYL) ACETAMIDO]PENICILLANIC ACID HALIDES AND SULFONATES
Hermann Breuer, Burgweinting, Germany, assignor to E. R. Squibb & Sons, Inc., Princeton, N.J.
No Drawing. Filed Sept. 24, 1971, Ser. No. 183,692
The portion of the term of the patent subsequent to Mar. 13, 1990, has been disclaimed
Int. Cl. C07d 99/16
U.S. Cl. 260—239.1       7 Claims

ABSTRACT OF THE DISCLOSURE

New 6-[(3,5,7-triaza-1-azonia-1-adamantyl)acetamido] penicillanic acid halides and sulfonates of the following general formula

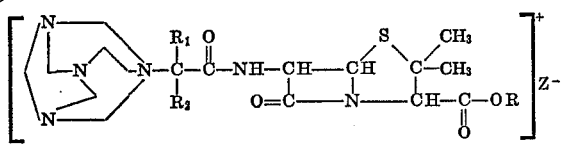

wherein R is hydrogen, lower alkyl, aralkyl or the group

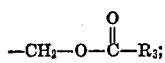

$R_1$ is hydrogen, lower alkyl, cyclo-lower alkyl, unsaturated cyclo-lower alkyl, aryl, aralkyl, adamantyl, cyclo-heptatrienyl or a heterocyclic group; $R_2$ is hydrogen or lower alkyl; $R_3$ is lower alkyl, aryl or aralkyl and Z is a halogen or sulfonate group; are useful as antibacterial agents.

SUMMARY OF THE INVENTION

This invention relates to new antibacterial 6-[(3,5,7-triaza-1-azonia-1-adamantyl)acetamido]penicillanic acid halides and sulfonates of the formula (I)

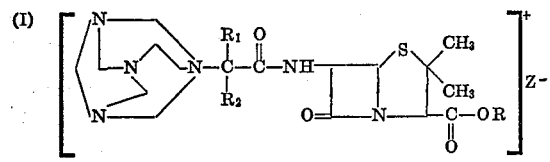

R represents hydrogen, lower alkyl, aralkyl or the group

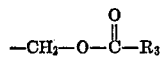

$R_1$ represents hydrogen, lower alkyl, cyclo-alkyl, unsaturated cycloalkyl, aryl, aralkyl, 1-adamantyl, 2,4,6-cycloheptatrienyl or a heterocyclic group; $R_2$ is hydrogen or lower alkyl; $R_3$ represents lower alkyl, aryl or aralkyl. Z is one of the halides chlorine, bromine or iodine or the sulfonate group —$OSO_2R_4$ wherein $R_4$ is lower alkyl, phenyl or tolyl.

The preferred members within each group are as follows: R is hydrogen, lower alkyl, especially hydrogen, methyl, pivaloyloxymethyl, $R_1$ is hydrogen or phenyl; $R_2$ is hydrogen; $R_3$ is lower alkyl preferably methyl or t-butyl and Z is bromine, chlorine or iodine (preferably the first two).

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like.

Cycloalkyl groups include cycloaliphatic groups having three to seven carbons in the ring such as cyclopropyl, cyclobutyl, cyclopentyl, cyclohexyl and cycloheptyl. The cyclic groups may also be cycloalkenyl and cycloalkadienyl groups of the same type, e.g., cyclobutenyl, cyclopentenyl, cyclohexenyl, cyclopentadienyl, cyclohexadienyl, etc. The 2,4,6-cycloheptatrienyl group is also included. The double bond or bonds may be variously located. A particularly preferred radical in this group is the 1,4-cyclohexadienyl group. These may be simply substituted with one to three groups such as halogen, lower alkyl or lower alkoxy.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, lower alkanoyl or lower alkanoyloxy. Illustrative are phenyl, o-, m- and p-chlorophenyl, o- m- and p-bromophenyl, 3,4 - dichlorophenyl, 3,5 - dibromophenyl, o-, m- and p-tolyl, p-methoxyphenyl, 3,4,5-trimethoxyphenyl and p-hydroxyphenyl.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The heterocyclic groups represented by $R_1$ are 5- to 6-membered monocyclic heterocyclic radicals (exclusive of hydrogen) containing nitrogen, sulfur or oxygen in the ring in addition to carbon (not more than two hetero atoms), and simply substituted members of this group as discussed above with respect to the aryl groups. The heterocyclic radicals include, for example, pyridyl, pyrrolidyl, morpholinyl, thienyl, furyl, oxazolyl, isoxazolyl, thiazolyl and the like, as well as the simply substituted members, especially the halo, lower alkyl (particularly methyl and ethyl), lower alkoxy (particularly methoxy and ethoxy), phenyl and hydroxy-lower alkyl (particularly hydroxymethyl and hydroxyethyl) substituted members. These heterocyclics are of the type found in U.S. Pats. 3,079,393, 3,079,400 and 3,534,085, for example.

Z is one of the halides chlorine, bromine or iodine, or a sulfonate radical derived from a lower alkylsulfonate such as methanesulfonate or benzenesulfonate or toluenesulfonate.

The compounds of formula I are produced by reacting a compound of the formula (II)

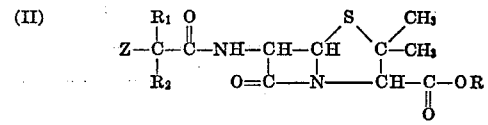

with hexamethylenetetramine in an inert organic solvent, chloroform being preferred, at about room temperature or below, e.g., about 10 to 25°.

When R is the acyloxymethyl group

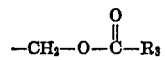

this group may be introduced onto the 6-aminopenicillanic acid moiety either prior to or subsequent to the reaction with the hexamethylenetetramine by treatment with one to two moles of a halomethyl ester of the formula (III)         hal—$CH_2OCOR_3$ wherein hal is hydrogen, preferably chlorine or bromine, in an inert organic solvent such as dimethylformamide, acetone, dioxane, benzene or the like at about ambient temperature or below.

It will be appreciated that certain of the compounds of this invention exist in various states of solvation as well as in different isomeric or optically active forms. The various forms as well as their mixtures are within the scope of this invention.

Further process details are provided in the illustrative examples.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of Formula I or a physiologically acceptable salt thereof may be used in various animal species in an amoutn of about 1 to 200 mg./kg., daily, orally or parenterally, in single or two to four divided doses to treat infections of bacterial origin, e.g., 5.0 mg./kg. in mice.

Oral forms give prompt high blood levels which are maintained for relatively long periods.

Up to about 600 mg. of a compound of Formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.1 to 1% by weight of such compounds admixed with, suspended or dissolved in conventional inert dry or aqueous carriers for application by washing or spraying.

They are also useful as nutritional supplements in animal feeds.

The following examples are illustrative of the invention. All temperatures are on the centigrade scale. Additional variations may be produced in the same manner by appropriate substitution in the starting material.

Example 1.—6-[(3,5,7-triaza-1-azonia-1-adamantyl) acetamido]penicillanic acid bromide 0.002 mol. of 6-(2-bromoacetamido)penicillanic acid (produced from bromacetyl chloride and 6-aminopenicillanic acid) are dissolved in 16 ml. of chloroform. 0.42 gm. (0.003 mol.) of hexamethylenetetramine are added. The clear solution is stirred overnight at a temperature of 10–15°. The mixture is filtered to remove a slight turbidity and the product 6-[(3,5,7-triaza-1-azonia-1-adamantyl) acetamido]penicillanic acid bromide is precipitated by the addition of ether.

Example 2.—6-[2-(3,5,7-triaza-1-azonia-1-adamantyl)-2-phenylacetamido]penicillanic acid bromide 0.002 mol. of 6-(2-bromo-2-phenylacetamido)penicillanic acid (produced from 2-bromo-2-phenacetyl bromide and 6-aminopenicillanic acid and 0.42 g. (0.003 mol.) of hexamethylenetetramine are dissolved in anhydrous chloroform and the clear solution is stirred overnight at a temperature of 10–15°. The solution is filtered to remove the turbidity. The addition of ether precipitates the product, 6-[2-(3,5,7-triaza-1-azonia-1-adamantyl)-2-phenylacetamido]penicillanic acid bromide.

Example 3.—6-[2-(3,5,7-triaza-1-azonia-1-admantyl)-2-phenylacetamido]penicillanic acid chloride By substituting 6-(2-chyoro-2-phenylacetamido)penicillanic acid for its 2-bromo analog in the procedure of Example 2, 6-[2,(3,5,7-triaza-1-azonia-1-adamantyl)-2-phenylacetamido]penicillanic acid chloride is obtained.

Example 4.—6-[(3,5,7-triaza-1-azonia-1-adamantyl) acetamido]penicillanic acid iodide By substituting 6-(2-iodoacetamido)penicillanic acid (prepared from iodoacetyl chloride and 6-aminopenicillanic acid for its 2-bromo analog in the procedure of Example 1, 6 - [(3,5,7 - triaza-1-azonia-1-adamantyl)acetamido]penicillanic acid iodide is obtained.

Example 5.—7-[2-(3,5,7-triaza-1-azonia-1-adamantyl)-2-phenylacetamido]penicillanic acid methyl ester bromide By substituting 6-(2-bromo-2-phenylacetamido)penicillanic acid methyl ester for the 6-(2-bromo-2-phenylacetamido)penicillanic acid in the procedure of Example 2, 6-[2 - (3,5,7 - triaza - 1 - azonia-1-adamantyl)-2-phenylacetamido]penicillanic acid methyl ester bromide is obtained.

The additional products having the formula in the following table are obtained according to the procedure of Example 1 by replacing the 6-(2-bromoacetamido)penicillanic acid with a compound of formula II having the substituents indicated in the table and reacting that with hexamethylenetetramine:

TABLE

[structural formula]

| Ex. | R | $R_1$ | $R_2$ | Z |
|---|---|---|---|---|
| 6 | $CH_3$ | H | $CH_3$ | Br |
| 7 | $C_2H_5$ | $CH_3$ | H | $OSO_2CH_3$ |
| 8 | $CH_3$ | $C_3H_7$ | H | Br |
| 9 | $-CH_2OOC-CH(CH_3)_2-$ | $C_6H_5CH_2-$ | $CH_3$ | Br |
| 10 | $-CH_2OOC-C_6H_5-$ | $4-ClC_6H_4-$ | H | Br |
| 11 | $C_2H_5$ | $3,4-(CH_3O)_2C_6H_3-$ | H | Cl |
| 12 | $C_2H_5$ | $3,4,5-(CH_3O)_3C_6H_2-$ | H | Cl |
| 13 | H | $4-CH_3C_6H_4-$ | H | Br |
| 14 | H | $3,4-(Br)_2C_6H_3CH_2-$ | H | Br |
| 15 | $C_2H_5$ | $2,4-(Cl)_2C_6H_3-$ | $C_2H_5$ | Br |
| 16 | $C_2H_5$ | 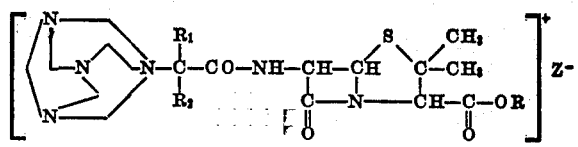 | H | Br |

TABLE—Continued

| Ex. | R | R₁ | R₂ | Z |
|---|---|---|---|---|
| 17 | C₂H₅ | morpholinyl | H | Br |
| 18 | C₂H₅ | 6-methylpyridin-2-yl | H | Br |
| 19 | C₂H₅ | thienyl | C₂H₅ | Cl |
| 20 | H | H | H | OSO₂—C₆H₅ |
| 21 | H | C₆H₅ | H | OSO₂—C₆H₄—CH₃ |
| 22 | C₆H₅CH₂ | furyl | H | Br |
| 23 | —CH₂OC(O)—CH(CH₃)₂ | C₆H₅— | H | Cl |
| 24 | —CH₂O—C(O)—CH(CH₃)₂ | H | H | Br |
| 25 | H | C₆H₅ | H | Br |
| 26 | —CH₂O—C(O)—CH(CH₃)₂ | C₆H₅— | CH₃ | Br |
| 27 | H | C₆H₅— | H | Br |
| 28 | H | phenyl | H | Br |
| 29 | H | cyclohexadienyl | H | Br |
| 30 | H | CH₃O—C₆H₄— | H | Br |
| 31 | H | thienyl | H | Br |
| 32 | H | thienyl (6-membered S) | H | OSO₂—C₆H₅ |
| 33 | H | adamantyl | H | Br |
| 34 | H | H | H | Cl |

Example 35

A sterile powder for reconstitution for use intramuscularly is prepared from the following ingredients which supply 1000 vials each containing 250 mg. of active ingredient:

|   | Gm. |
|---|---|
| 6-[(3,5,7-triaza - 1 - azonia-1-adamantyl)acetamido] penicillanic acid bromide, sterile | 250 |
| Lecithin powder, sterile | 50 |
| Sodium carboxymethylcellulose, sterile | 20 |

The sterile powders are aseptically blended and filled into sterile vials, and sealed. The addition of 1 ml. of water for injection to the vial provides a suspension for intramuscular injection.

What is claimed is:

1. A compound of the formula

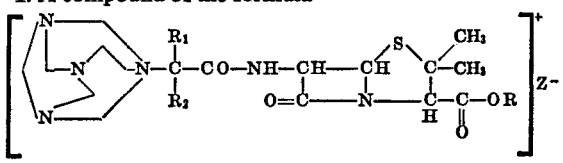

wherein R is hydrogen, lower alkyl, aralkyl or

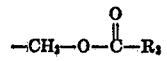

$R_1$ is hydrogen, lower alkyl, cyclopropyl, cyclobutyl, cyclopentyl, cyclohexyl, cycloheptyl, cyclobutenyl, cyclopentenyl, cyclohexenyl, cyclopentadienyl, cyclohexadienyl, 2,4,6-cycloheptatrienyl, aryl, aralkyl, adamantyl or a monocyclic heterocyclic of the group consisting of $R_4$-pyridyl, $R_4$-pyrrolidyl, $R_4$-morpholinyl, $R_4$-thienyl, $R_4$-furyl, $R_4$-oxazolyl $R_4$-isoxazolyl and $R_4$-thiazolyl; $R_2$ is hydrogen or lower alkyl; $R_3$ is lower alkyl, aryl or aralkyl; $R_4$ is hydrogen, halo, lower alkyl, lower alkoxy, phenyl or hydroxy-lower alkyl; Z is halogen or sulfonate group; each of said aryl and aralkyl groups being $R_5$-phenyl or $R_5$-phenyl-lower alkyl, respectively, wherein $R_5$ is hydrogen, halo, lower alkyl, lower alkoxy, hydroxy, lower alkanoyl or lower alkanoyloxy.

2. A compound as in claim 1 wherein R, $R_1$ and $R_2$ each is hydrogen and Z is bromine.

3. A compound as in claim 1 wherein R, $R_1$ and $R_2$ each is hydrogen and Z is chlorine.

4. A compound as in claim 1 wherein R and $R_2$ each is hydrogen, $R_1$ is phenyl and Z is bromine.

5. A compound as in claim 1 wherein R and $R_2$ each is hydrogen, $R_1$ is phenyl and Z is chlorine.

6. A compound as in claim 1 wherein R is hydrogen, lower alkyl or pivaloyloxymethyl; $R_1$ is hydrogen or phenyl; $R_2$ is hydrogen and Z is bromine or chlorine.

7. A compound as in claim 1 wherein $R_1$ is hydrogen or lower alkyl.

References Cited
UNITED STATES PATENTS
3,427,302   2/1969   Essery _____ 260—239.1

NICHOLAS S. RIZZO, Primary Examiner

U.S. Cl. X.R.
424—271